INVENTOR.
JOHN A. KLOD
BY Clarence E. Thrudy
HIS ATTORNEY.

United States Patent Office 2,796,104
Patented June 18, 1957

2,796,104

MEAT GRINDER HAVING BEARING PINS

John A. Klod, Chicago, Ill.

Application December 29, 1954, Serial No. 478,228

3 Claims. (Cl. 146—186)

This invention relates to certain new and useful improvements in a meat grinder having bearing pins, and more particularly in the shaft bearing thereof.

The present invention constitutes an improvement over that shown in my pending application, Serial No. 362,074, now Patent No. 2,743,751. In addition to accomplishing the several objects stated in such pending application, the present invention has as an object the provision of projecting the shaft bearing from either side of the perforated plate of the meat grinder, thereby to permit the perforated plate to be mounted in the meat grinder with either of its flat surfaces in cooperative relation with the cutting knives of the grinder. By accomplishing this object, the knife-engaging surfaces of the perforated plate will at all times be maintained smooth and in proper cutting relation with respect to the cutting knives.

Other objects will appear hereinafter.

The invention consists in the novel combination and arrangement of parts to be hereinafter described and claimed.

The invention will be best understood by reference to the accompanying drawings showing the preferred form of construction, and in which.

Figure 1:
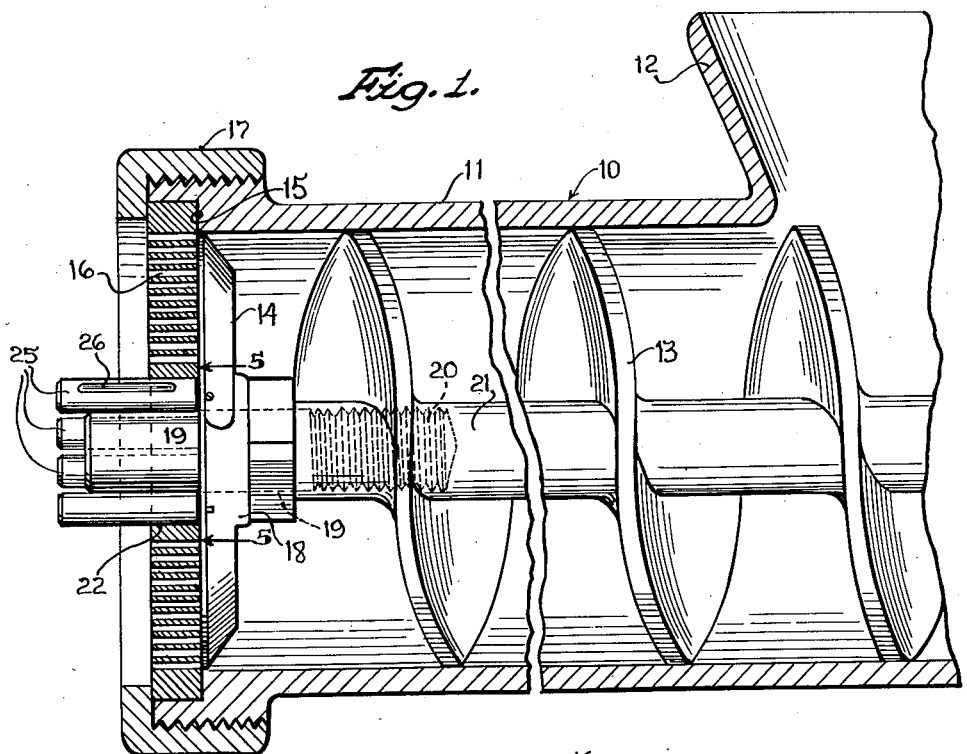
Fig. 1 is a longitudinal fragmentary sectional detail view depicting a conventional meat grinder having incorporated therein my invention.
Figure 3:
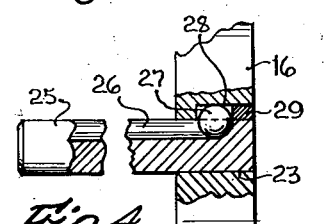
Fig. 3 is a perspective view of one of the bearing elements of the bearing cage.
Figure 4:
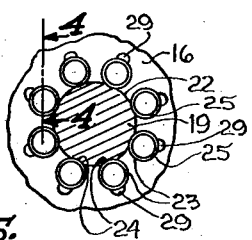
Fig. 4 is an enlarged fragmentary sectional detail view taken substantially on line 4—4 of Fig. 5.
Figure 5:
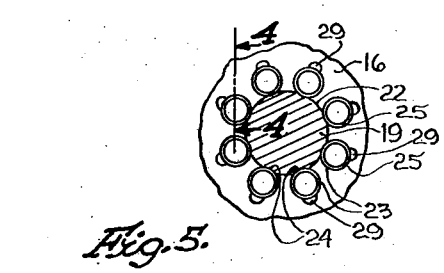
Fig. 5 is a fragmentary sectional detail view taken substantially on line 5—5 of Fig. 1.
Figure 2:
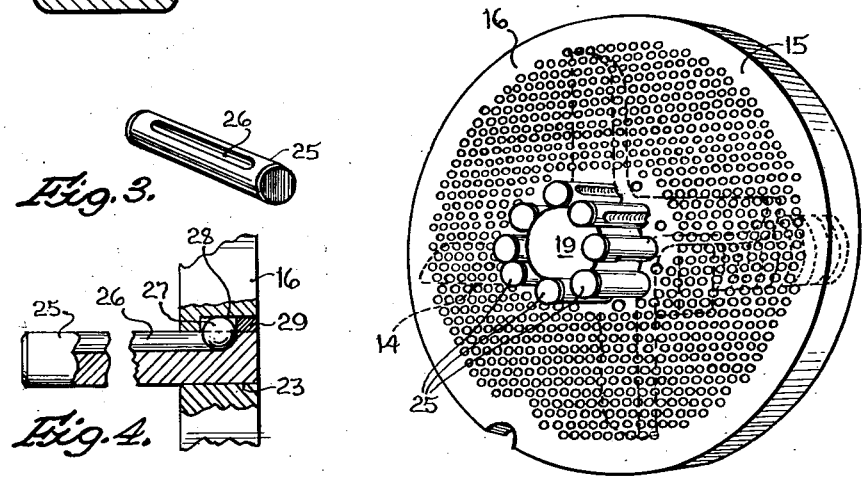
Fig. 2 is a perspective view of the perforated plate of the meat grinder showing my improved bearing cage associated therewith.

The several objects of my invention may be accomplished by the preferred form of construction shown in the accompanying drawings. In this connection, a conventional meat grinder is indicated at 10. This meat grinder 10 includes a housing 11 having a funnel 12 through which meat to be ground is admitted into the housing 11.

Arranged in the housing 11 is a conventional feed screw 13 for feeding the meat to be ground to the cutter blades or knives 14. The cutter blades 14 rotate over an adjacent flat surface 15 of a perforated plate 16 secured to the housing 11 by means of a screw cap 17. The cutter blades 14 are assembled about a hub 18 mounted on a stud shaft 19. The inner end portion of the stud shaft 19 is threaded as at 20 into the adjacent end portion of the shaft 21 of the feed screw 13.

The outer end portion of the shaft 19 projects through an opening 22 formed in the perforated plate 16. Formed in the perforated plate 16 circumferentially with respect to the opening 22 are a plurality of openings 23, each of which communicates with the opening 22 through transverse slots 24 provided by the drilling operation of the openings 23.

In these openings 23 are arranged a plurality of pins 25, cylindrical portions of which project through the slots 24 for bearing engagement with the adjacent end portion of the stud shaft 19. These pins 25 provide a bearing cage for the stud shaft 19. Each pin 25 has a longitudinal groove 26 formed therein terminating short of the opposite ends of each pin to provide a race for a ball element 27. This ball element 27 is enclosed in the plate 16 by confining the ball element 27 in an open socket 28 communicating with the adjacent groove 26 and drilled in the plate 16 from one side thereof. After the ball 27 has been thus positioned in its respective groove 26, the socket 28 is plugged by a suitable plug 29 thereby confining the ball therein and in the groove 26.

The arrangement is such that the bearing pins 25 as a body may be shifted to project from either of the flat sides of the perforated plate 16. This arrangement permits the plate 16 to be positioned with either of its sides 15 in contact with the cutter blades 14. By such arrangement the plate 16 presents at all times a smooth surface over which the knives 14 are adapted to be rotated in meat grinding operation.

It will be noted that as the grooves 26 terminate short of the ends of the pins 25, the ball elements 27 will limit the slidable movement of the pins relative to the plate 16.

By using the flat surfaces 15 of the plate 16 alternately in confronting relation with the cutter blades 14, the wear of the plate 16 is substantially reduced and its life materially extended.

By virtue of the construction herein described, particularly with respect to the bearing for the screw shaft, it is manifest that should for any reason the blade-engaging side of the perforated plate 16 become damaged, wavy, or otherwise rendered unfit for meat grinding purposes, by simply removing the screw cap 17 and the plate 16 from its mounting in the housing 11, the bearing structure may be slidably projected from the worn or damaged side of the plate 16 so as to permit the opposite flat side of the plate to be arranged in cutting relation with respect to the blades 14, thus rendering it unnecessary for the user to return the plate to the manufacturer for service or replacement of a new plate.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A bearing for a shaft comprising, in combination with a plate having an opening through which said shaft projects and a plurality of openings circumferentially disposed with respect to said opening and communicating with the latter, a shaft of a feed screw having one end projecting through the opening of said plate, a plurality of elongated bearing pins slidably arranged in said circumferentially disposed openings in bearing contact with said shaft, each of said pins having formed therein a longitudinally extending groove terminating short of the ends of said pin, ball elements enclosed in said plate and projecting into said grooves to provide slidable connection between said pins and said plate and for limiting the slidable movement of said pins relative to said plate.

2. A bearing structure for the shaft of a feed screw of a meat grinder having a perforated plate through an opening of which said shaft projects comprising a plurality of elongated bearing pins arranged circumferentially about and in contact with one end of said shaft, means providing slidable connection between said pins and said plate to permit said pins to be shifted through said plate so as to project out therefrom on either side thereof.

3. A bearing structure for the shaft of a feed screw of a meat grinder having a perforated plate through an opening of which one end of the shaft projects, said plate having formed therethrough a plurality of passages about said opening and communicating therewith, a plurality of bearing pins slidably contained in said passages circumferentially about and in contact with one end of said shaft, means in said passages providing slidable connections between said pins and said plate to permit said pins to be shifted longitudinally of said passage and transversely of said plate so as to project out of either side of said plate.

References Cited in the file of this patent

UNITED STATES PATENTS

| | | |
|---|---|---|
| 1,084,854 | Ganzhorn | Jan. 20, 1914 |
| 2,265,065 | Daywalt et al. | Dec. 2, 1941 |
| 2,624,384 | Ward | Jan. 6, 1953 |